US012222756B2

(12) United States Patent
Zhao et al.

(10) Patent No.: US 12,222,756 B2
(45) Date of Patent: Feb. 11, 2025

(54) SUPPORT STRUCTURAL MEMBER AND DISPLAY DEVICE

(71) Applicant: KunShan Go-Visionox Opto-Electronics Co., Ltd, Jiangsu (CN)

(72) Inventors: Yongfeng Zhao, Jiangsu (CN); Fan Dong, Jiangsu (CN); Liwei Ding, Jiangsu (CN); Fu Liao, Jiangsu (CN); Hongqi Hou, Jiangsu (CN); Zheng Li, Jiangsu (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 203 days.

(21) Appl. No.: 18/190,480

(22) Filed: Mar. 27, 2023

(65) Prior Publication Data
US 2023/0229191 A1 Jul. 20, 2023

Related U.S. Application Data

(63) Continuation of application No. PCT/CN2021/126613, filed on Oct. 27, 2021.

(30) Foreign Application Priority Data

Jan. 27, 2021 (CN) .......................... 202110112033.5

(51) Int. Cl.
G06F 1/16 (2006.01)
H04M 1/02 (2006.01)

(52) U.S. Cl.
CPC .......... *G06F 1/1624* (2013.01); *G06F 1/1652* (2013.01); *G06F 1/1681* (2013.01); *H04M 1/0237* (2013.01); *H04M 1/0268* (2013.01)

(58) Field of Classification Search
CPC .... G06F 1/1624; G06F 1/1652; G06F 1/1681; G06F 1/1637; G06F 1/1677;
(Continued)

(56) References Cited

U.S. PATENT DOCUMENTS 6,057,607 A 5/2000 Rader, III et al.
11,016,532 B2 * 5/2021 Yang ................... H04M 1/0268
(Continued)

FOREIGN PATENT DOCUMENTS

CN 108664087 A 10/2018
CN 109658825 A 4/2019
(Continued)

OTHER PUBLICATIONS

Notification to Grant Patent Right for Invention issued on Oct. 21, 2022, in corresponding Chinese Application No. 202110112033.5, 6 pages.

(Continued)

Primary Examiner — Abhishek M Rathod
(74) Attorney, Agent, or Firm — Maier & Maier, PLLC

(57) ABSTRACT

Support structural members, which are used in a flexible display panel. The support structural members comprise a main body support member, which includes a bearing part used for bearing a portion of the flexible display panel; a sliding support member, which is connected to the main body support member in a manner that allows movement along a second direction, the sliding support member includes a first support part and a second support part which are distributed at an interval along a first direction, the first support part being used for extending the main body support member and jointly supporting the flexible display panel with the bearing part; a pushing member, which is connected (Continued)

to the second support part in a manner that allows movement along the second direction, the pushing member includes a stopping part.

19 Claims, 7 Drawing Sheets

(58) Field of Classification Search
CPC .... G06F 1/1601; G06F 1/1656; G06F 1/1635; G06F 1/3215; G06F 1/3218; G06F 1/3262; H04M 1/0237; H04M 1/0268
See application file for complete search history.

(56) References Cited

U.S. PATENT DOCUMENTS

| | | | | |
|---|---|---|---|---|
| 11,768,519 | B2 * | 9/2023 | Feng | G06F 1/1637 |
| | | | | 361/679.27 |
| 11,921,545 | B2 * | 3/2024 | Feng | H04M 1/0268 |
| 12,019,479 | B2 * | 6/2024 | Han | G06F 1/1652 |
| 2005/0017137 | A1 | 1/2005 | Burris | |
| 2012/0314400 | A1 | 12/2012 | Bohn et al. | |
| 2018/0081473 | A1 * | 3/2018 | Seo | G06F 1/3218 |
| 2018/0188778 | A1 * | 7/2018 | Shin | G06F 1/1652 |
| 2020/0033913 | A1 | 1/2020 | Yang | |
| 2021/0328160 | A1 * | 10/2021 | Feng | G06F 1/1652 |
| 2021/0373603 | A1 * | 12/2021 | Feng | G06F 1/1624 |
| 2021/0383727 | A1 * | 12/2021 | Han | G06F 1/1656 |
| 2023/0283697 | A1 * | 9/2023 | Kim | G09F 9/30 |
| | | | | 455/575.4 |

FOREIGN PATENT DOCUMENTS

| | | |
|---|---|---|
| CN | 209515060 U | 10/2019 |
| CN | 111243440 A | 6/2020 |
| CN | 111508374 A | 8/2020 |
| CN | 111510536 A | 8/2020 |
| CN | 111768709 A | 10/2020 |
| CN | 111968503 A | 11/2020 |
| CN | 112133203 A | 12/2020 |
| CN | 112153180 A | 12/2020 |
| CN | 112153181 A | 12/2020 |
| CN | 112797277 A | 5/2021 |
| KR | 101107127 B1 | 1/2012 |

OTHER PUBLICATIONS

Office Action issued on May 7, 2022, in corresponding Chinese Application No. 202110112033.5, 8 pages.
Extended Search Report issued on Apr. 3, 2024, in corresponding European Application No. 21922406.0, 8 pages.
Office Action issued on May 7, 2024, in corresponding Japanese Application No. 2023-526631, 8 pages.
International Search Report mailed Jan. 27, 2022, in International Application No. PCT/CN2021/126613, 4 pages.

* cited by examiner

SUPPORT STRUCTURAL MEMBER AND DISPLAY DEVICE

CROSS REFERENCE

The present disclosure is a continuation of International Application No. PCT/CN2021/126613, filed on Oct. 27, 2021, which claims priority to the Chinese patent application No. 202110112033.5, titled "Support Structural Member and Display Device", filed on Jan. 27, 2021, both of which are hereby incorporated by reference in their entireties.

TECHNICAL FIELD

The present disclosure relates to the technical field of a display device, and in particular, to a support structural member and a display device.

BACKGROUND

With the development of flexible display technology, flexible screens are increasingly used in terminal equipment. In terminal equipment, a flexible screen is usually combined with a flexible screen support structure, and the flexible screen support structure is used to realize bending or folding of the flexible screen. Compared with traditional screens, flexible screens have advantages, such as lightness and thinness, low power consumption, and as flexible screens are bendable and flexible, their application scenarios are becoming more and more extensive. However, in the prior art, when the support structure of the flexible display screen is unfolded, a sliding mechanism directly acts on a screen body, which will lead to excessive force on the screen body and affect the service life of the screen body.

SUMMARY

The present disclosure provides a support structural member and a display device, aiming to provide a good support to a flexible display panel and improve the service life of the flexible display panel.

A first aspect of the present disclosure provides a support structural member for a flexible display panel, comprising: a main body support member, comprising a bearing portion for bearing a part of the flexible display panel; a sliding support member, movably connected to the main body support member along a second direction, wherein the sliding support member comprises a first support portion and a second support portion spaced along a first direction, and the first support portion extends beyond the main body support member and supports the flexible display panel together with the bearing portion; a pushing member, movably connected to the second support portion along the second direction, wherein the pushing member comprises a stopper, and the stopper protrudes from a support surface of the second support portion for supporting the flexible display panel, so the stopper stops an end of the flexible display panel and pushes the flexible display panel to move.

A second aspect of the present disclosure provides a display device, comprising: the support structural member of any one of the above embodiments; a flexible display panel, comprising a first end and a second end opposite to each other, wherein the first end is connected to the main body support member, the second end is located on the second support portion and is stopped by the stopper, so the stopper can push the second end to move in a direction away from the main body support member.

In the support structural member of the embodiment of the present disclosure, the support structural member includes the main body support member, the sliding support member and the pushing member. The sliding support member is movably connected to the main support member along the second direction. When the sliding support member moves relative to the main body support member along the second direction, the first support portion of the sliding support member can support the flexible display panel together with the bearing portion of the main body support member, so as to increase a display area and realize large-screen display. In addition, the stopper of the pushing member is arranged on the second support portion of the sliding support member, and the stopper protrudes from the support surface of the second support portion, so that the stopper can stop an end of the flexible display panel. The flexible display panel can be pushed to move by the stopper, so that a part of the flexible display panel folded on a second side is moved to a first side. In the embodiment of the present disclosure, by an end of the flexible display panel is pushed to realize a large-screen display. The stopper acts on the end of the flexible display panel instead of the surface of the flexible display panel, which can reduce the stress on the flexible display panel and improve the service life of the display panel.

DETAILED DESCRIPTION

For a better understanding of the present disclosure, a support structural member and a display device of embodiments of the present disclosure will be described in detail below with reference to FIGS. 1 to 13.

Figure 1:
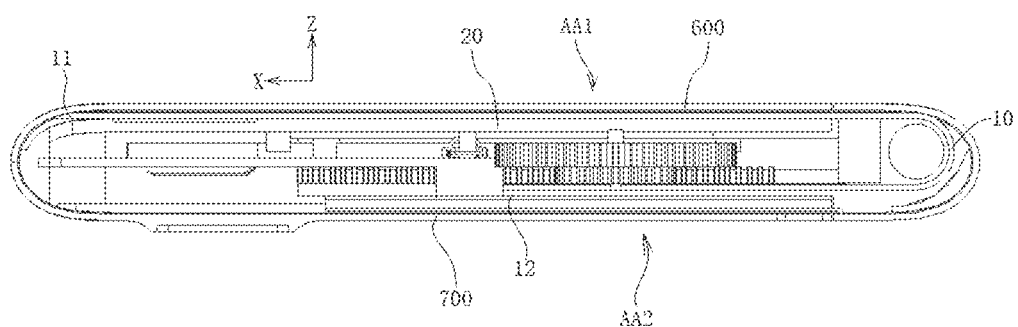
FIG. 1 is a schematic structural diagram of a display device provided by an embodiment of the present disclosure in a state.
Figure 2:
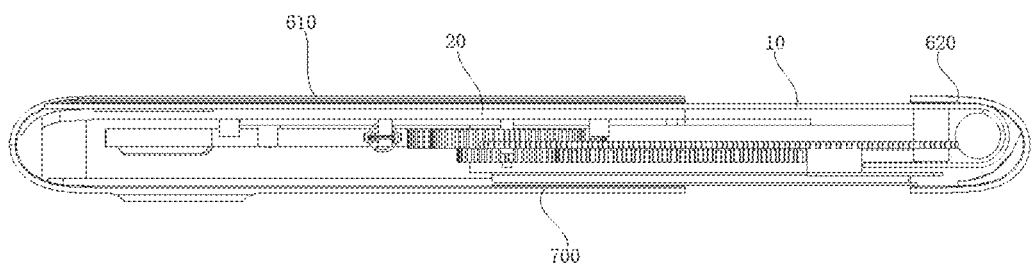
FIG. 2 is a schematic structural diagram of a display device provided by an embodiment of the present disclosure in another state.

Please refer to FIG. 1 and FIG. 2 together. According to an embodiment of the present disclosure, a display device is provided. The display device includes a flexible display panel 10 and a support structural member 20. The support structural member 20 is used to provide support for the flexible display panel 10. The display device includes a first side AA1 and a second side AA2 disposed opposite to each other in a first direction (Z direction in FIG. 1).

The display device in the embodiment of the present disclosure includes but are not limited to a mobile phone, a personal digital assistant (Personal Digital Assistant, PDA for short), a tablet computer, an e-book, a television, access control, a smart fixed phone, a console, and other devices with display functions.

In some optional embodiments, the flexible display panel 10 can be bent and the support structural member 20 can be retracted, and at least part of the flexible display panel 10 can be bent and extends to the second side AA2 of the support structural member 20. When the support structural member 20 is deployed, the flexible display panel 10 located on the second side AA2 can move to the first side AA1, thereby increasing the display area of the display device. For example, when the support structural member is changed from the state shown in FIG. 1 to the state shown in FIG. 2, the size of the display device in the second direction (X direction in FIG. 1) increases, the display area of the flexible display panel 10 on the first side AA1 increases, and a displayable area of the display device increases.

Optionally, the flexible display panel 10 includes a first end 11 and a second end 12 opposite to each other, the first end 11 is located on the first side AA1, and the second end 12 is located on the second side AA2, so that a part of the flexible display panel 10 is located on the first side AA1, and the other part of the flexible display panel 10 is bent and extends to the second side AA2 of the support structural member 20.

Figure 3:
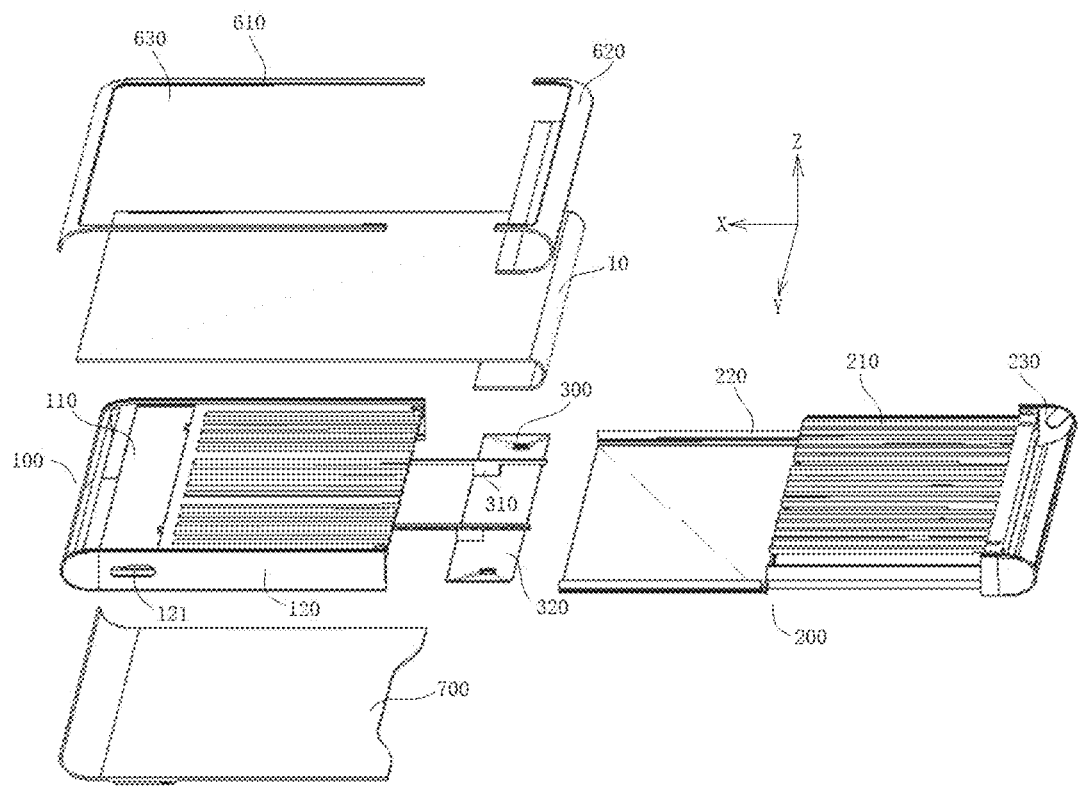
FIG. 3 is an exploded perspective view of a support structural member provided by an embodiment of the present disclosure.

In order to better show the relative positional relationship between the support structural member 20 and the flexible display panel 10 when the support structural member 20 is used to support the flexible display panel 10, the structure of the support structural member 20 is shown in FIG. 3.

Another embodiment in another aspect of the present disclosure provides the support structural member 20 for supporting the flexible display panel 10. The support structural member 20 includes the main body support member 100, the sliding support member 200 movably connected to the main body support member 100 along the second direction, and the pushing member 300 movably connected to the sliding support member 200 along the second direction. The main body support member 100 includes a bearing portion 110 for bearing a part of the flexible display panel 10. The sliding support member 200 includes a first support portion 210 and a second support portion 220 spaced along the first direction, the first support part 210 is used to extend beyond the main body support member 100 and support the flexible display panel 10 together with the bearing portion 110. The pushing member 300 is movably connected to the second support portion 220 along the second direction. The pushing member 300 includes a stopper 310, and the stopper 310 protrudes from the support surface of the second support portion 220 for supporting the flexible display panel 10, so that the stopper 310 can stop an end of the flexible display panel 10 and push the flexible display panel 10 to move.

In the support structural member 20 of the embodiment of the present disclosure, the first support portion 210 of the sliding support member 200 can support the flexible display panel 10 together with the bearing portion 110 of the main body support member 100, so as to increase the display area and realize large-screen display.

In addition, the stopper 310 of the pushing member 300 is disposed on the second support portion 220 of the sliding support member 200, and the stopper 310 protrudes from the support surface of the second support portion 220, so that the stopper 310 can stop an end of the flexible display panel 10. For example, the stopper 310 may stop the second end 12 of the flexible display panel 10. The flexible display panel 10 can be pushed to move by the stopper 310, so that the part of the flexible display panel 10 folded and disposed on the second side AA2 moves to the first side AA1. In the embodiment of the present disclosure, one end of the flexible display panel 10 is pushed to realize the large-screen display, and the stopper 310 acts on one end of the flexible display panel 10 instead of the surface of the flexible display panel 10, which can reduce the force on the flexible display panel 10 and increase the service life of the flexible display panel 10.

Optionally, the support structural member 20 further includes a guard component 600. The guard component 600 is disposed on outer surfaces of both the main body support member 100 and the sliding support member 200, and the guard component 600 is spaced apart from the body support member 100 and the sliding support member 200, so that the flexible display panel 10 can be located between the main body support member 100, the sliding support member 200 and the guard component 600.

Optionally, the support structural member 20 further includes a back cover 700 connected to the guard component 600 and located on the second side AA2. For example, the back cover 700 is provided with components such as a camera. The back cover 700 is connected to the guard component 600 and encloses a protective cavity is with the guard component 600. Other components of the support structure 20 and the flexible display panel 10 are located in the protective cavity.

The guard component 600 includes a first guard portion 610 disposed on the main body support member 100 and a second guard portion 620 disposed on the sliding support member 200. A visible window 630 is formed between the first guard portion 610 and the second guard portion 620. The flexible display panel 10 can be exposed from the visible window 630, and a user views the display screen of the flexible display panel 10 from the visible window 630. During the movement of the sliding support member 200 relative to the main body support member 100, the second guard portion 620 moves with the sliding support member 200. The second guard portion 620 is wrapped around an outer periphery of the transitional connection portion 230.

Figure 4:
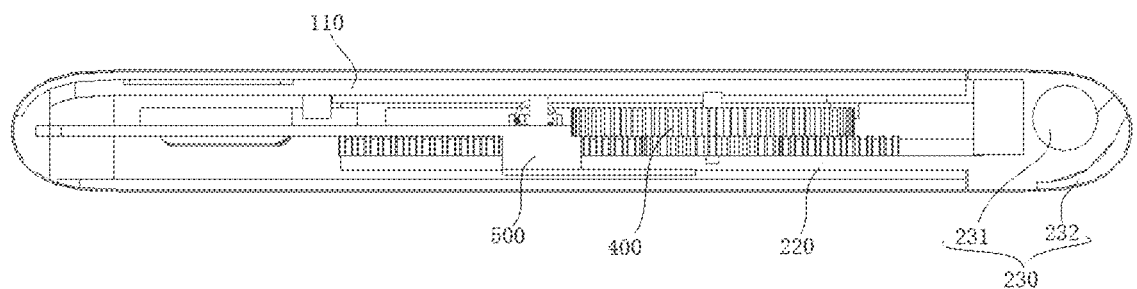
FIG. 4 is a cross-sectional view of a support structural member provided by an embodiment of the present disclosure.
Figure 5:
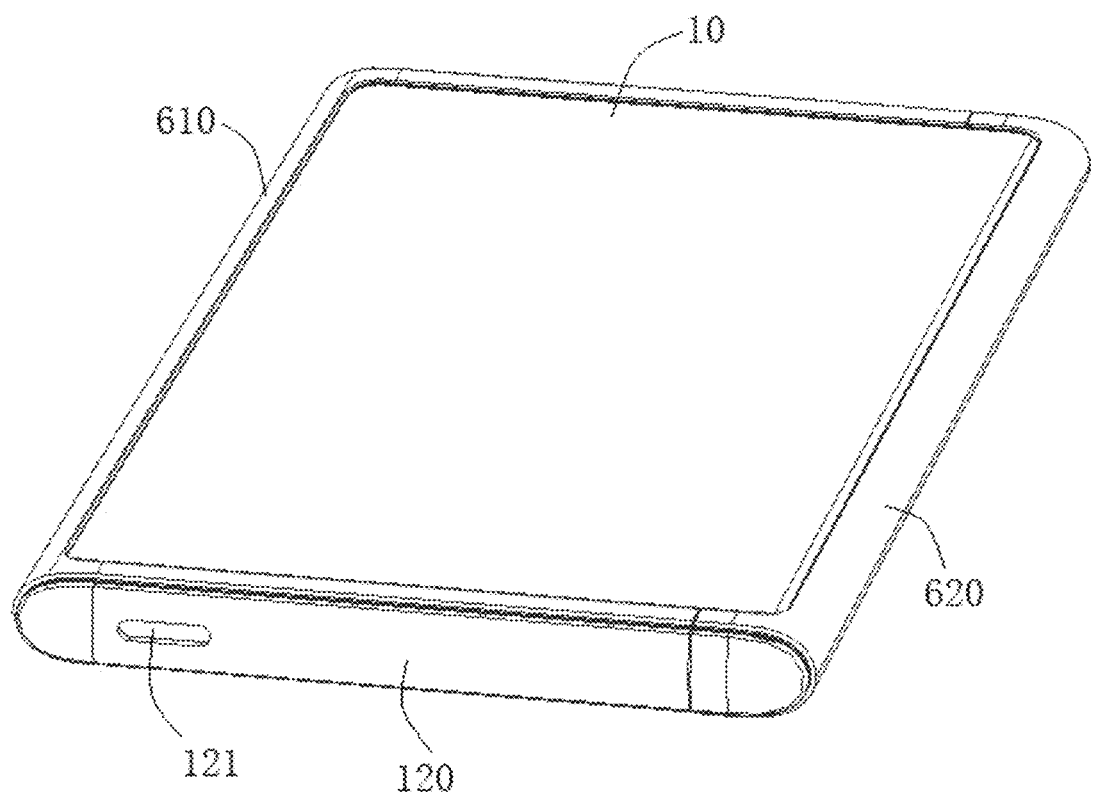
FIG. 5 is a schematic structural diagram of a support structural member provided in an embodiment of the present disclosure in a retracted state.

As shown in FIG. 4, a first limiting member 231 and a second limiting member 232 are disposed in the transition connection portion 230. A gap is formed between the first limiting member 231 and the second limiting member 232, and the flexible display panel 10 passes through the gap between the first limiting member 231 and the second limiting member 232.

There are various ways to provide the pushing member 300. For options, please continue to refer to FIG. 3. The pushing member 300 includes a main body portion 320. The main body portion 320 has a bearing surface for bearing the flexible display panel 10, and the stopper 310 is provided on the main body portion 320 and protruding from the bearing surface.

A plurality of stoppers 310 are distributed at intervals along the third direction (the Y direction in FIG. 3) on the main body portion 320, so that the stoppers 310 can stop different parts of the second end 12 in the third direction.

In other embodiments, there are more than two stoppers 310, and the two or more stoppers 310 are distributed at intervals along the third direction, so that the two or more stoppers 310 can stop different parts at the second end 12 in the third direction.

Optionally, the support structural member 20 has a retracted state and a deployed state.

Please continue to refer to FIGS. 5 to 10, in the retracted state, part of the second support portion 220 and the bearing portion 110 are stacked along the first direction, and the size of the support structural member 20 in the second direction is smaller.

In the deployed state, a part of the second support portion 220 protrudes from the main body support member 100, and the size of the support structural member 20 in the second direction is relatively large.

When the support structural member 20 is transformed from the retracted state to the deployed state, the sliding support member 200 moves in a direction away from the main body support member 100, and at least part of the second support portion 220 protrudes from the bearing portion 110. In the second direction, the size of the support structural member 20 in the retracted state is smaller than its dimension in the deployed state. That is, when the support structural member 20 is transformed from the retracted state to the deployed state, the size of the support structural member 20 in the second direction will increase.

As shown in FIG. 10 to FIG. 13, the support structural member 20 provided according to the embodiment of the present disclosure further includes a drive component 400. The drive component 400 is used to drive the sliding support member 200 to move relative to the main body support member 100 and to drive the pushing member 300 to move relative to the second support portion 220.

When the pushing member 300 pushes the second end 12 of the flexible display panel 10 to move, that is, when the flexible display panel 10 is gradually deployed from the folded state, the drive component 400 also drives the sliding support member 200 to move in a direction away from the main body support member 100, thereby improving the friction damage to the flexible display panel 10 caused by the flexible display panel 10 driving the sliding support member 200 to move, and further improving the service life of the flexible display panel 10.

Optionally, the flexible display panel 10 is U-shaped in the folded state, the drive component 400 drives the sliding support member 200 to move relative to the main body support 100 at a first speed V1, and the drive component 400 drives the pushing member 300 to move relative to the second support portion 220 at a second speed V2. The second speed V2 is twice the first speed V1, that is, V1:V2=1:2.

In these optional embodiments, when the sliding support member 200 protrudes from the main body support member 100 along the second direction by a length L, the flexible display panel 10 located on the first side AA1 and the second side AA2 protrude from the main body support member 100 by a length L, the moving distance of the second end 12 of the flexible display panel 10 on the second side AA2 is 2 L. When the ratio of the first speed V1 to the second speed V2 is 1:2, the distance moved by the pushing member 300 is twice the distance moved by the sliding support member 200 in the same time period. The flexible display panel 10 extends from the main body support member 100 at a speed close to the speed at which the sliding support member 200 extends from the main body support member 100. The distance of the flexible display panel 10 extending beyond the main body support member 100 is equal to the moving distance of the sliding support member 200.

Optionally, the sliding support member 200 further includes the transition connection portion 230 on its side away from the main body support member 100, and the first support portion 210 and the second support portion 220 are connected to each other via the transition connection portion 230. The flexible display panel 10 extends to the second support portion 220 around the transitional connection portion 230.

When the support structural member 20 is transformed from the retracted state to the deployed state, as the speed at which the flexible display panel 10 extends from the main body support member 100 is close to the speed at which the sliding support member 200 extends from the main body support member 100 in the same time period, the distance of the flexible display panel 10 protruding from the main body support member 100 is equal to the moving distance of the sliding support member 200, the stability of the distance between the flexible display panel 10 and the transitional connection portion 230 is ensured and the friction damage of the transitional connection portion 230 to the flexible display panel 10 is improved and the service life of the flexible display panel 10 is increased.

In some other optional embodiments, the flexible display panel 10 is wavy in the folded state, a part of the flexible display panel 10 is located on the first side AA1, and the other part bypasses the sliding support member 200 and is U-shaped or wavy on the second side AA2. The second speed V2 is an integer multiple of the first speed V1.

For example, when the flexible display panel 10 is in a wavy shape in the folded state, a part of the flexible display panel 10 is located on the first side AA1, and the other part bypasses the sliding support member 200 and is U-shaped on the second side AA2. In the folded state, the flexible display panel 10 is in a three-folded state, and the flexible display panel 10 in the folded state includes three layers stacked in the first direction, so the second speed V2 is three times the first speed V1.

In these optional embodiments, when the support structural member 20 is stretched and retracted, the speed at which the flexible display panel 10 extends from the main body support member 100 is close to the speed at which the sliding support member 200 extends from the main body support member 100, thereby ensuring the stability of the distance between the flexible display panel 10 and the transition connection portion 230, improving the friction damage to the flexible display panel 10 caused by the transition connection portion 230, and further improving the service life of the flexible display panel 10.

The drive component 400 can be arranged in various manners. For example, the drive component 400 may be a motor, and the motor drives the pushing member 300 and the stopper 310 to move.

In other optional embodiments, the drive component 400 includes a first driving group 410 and a second drive group 420. The first drive group 410 includes a first drive wheel 411 and a first rack 412 that are engaged with each other. The first rack 412 is connected to the stopper 310 and is extended and formed in the second direction. The second drive group 420 includes a second drive wheel 421 and a second rack 422 that are engaged with each other. The second rack 422 is connected to the second support portion 220 and is extended and formed in the second direction. The second drive wheel 421 and the first drive wheel 411 are engaged with each other.

The first drive group 410 drives the stopper 310 to move via the first drive wheel 411 and the first rack 412. The second drive group 420 drives the sliding support member 200 to move via the second drive wheel 421 and the second rack 422. The first drive wheel 411 and the second drive wheel 421 are engaged with each other, so that the first drive wheel 411 and the second drive wheel 421 can be linked together. When the first drive wheel 411 pushes the stopper 310 to move via the first rack 412, the second drive wheel 421 also pushes the sliding support member 200 to move via the second rack 422.

Optionally, the second drive wheel 421 includes a first gear 421a and a second gear 421b coaxially arranged, the first gear 421a and the first drive wheel 411 are engaged with each other, and the second gear 421b and the second rack 422 are engaged with each other. And the radius of the first gear 421a is an integer multiple of the radius of the second gear 421b.

In these optional embodiments, the second drive wheel 421 includes the first gear 421a and the second gear 421b, and the first gear 421a and the first drive wheel 411 are engaged with each other, so the rotational speeds of the first gear 421a and the first drive wheel 411 are equal, and the rotational distances of the first gear 421a and the first drive wheel 411 are equal. The second gear 421b and the second rack 422 are engaged with each other, and the second gear 421b is used to drive the second rack 422 to be engaged with each other. The radius of the first gear 421a is an integer multiple of the radius of the second gear 421b, so the rotation distance of the first gear 421a is an integer multiple of the rotation distance of the second gear 421b, and the second speed V2 is an integer multiple of the first speed V1.

Optionally, the ratio of the second speed V2 to the first speed V1 is equal to the ratio of the radius of the first gear to the radius of the second gear.

As above, in some optional embodiments, when the second speed V2 is twice the first speed V1, that is, V1:V2=1:2, the radius of the first gear 421a is twice the radius of the second gear 421b. The rotational distance of the first gear 421a is twice the rotational distance of the second gear 421b in the same time period, so that the second speed V2 is twice the first speed V1.

In other optional embodiments, when the second speed V2 is three times the first speed V1, the radius of the first gear 421a is three times the radius of the second gear 421b, and the first gear 421a rotates at the same time. The distance is three times the rotational distance of the second gear 421b, so that the second speed V2 is three times the first speed V1.

The drive component 400 of the embodiment of the present disclosure has a simple structure and is convenient to be implemented, and the purpose of reducing the weight of the display device can be achieved and the installation can be simplified.

In the support structural member 20 provided in the embodiment of the present disclosure, there are various ways of driving the first drive group 410 and the second drive group 420. For example, the first drive group 410 is an active drive group. The first drive wheel 411 in the first drive group 410 can be driven to rotate by the drive structure, so that the first drive wheel 411 drives the first rack 412 and the second drive wheel 421 to rotate, and the second drive wheel 421 drives the second rack 422 to rotate. Or, the first rack 412 in the first driving group 410 is driven to move via the drive structure, the first rack 412 drives the first drive wheel 411 to rotate, the first drive wheel 411 drives the second drive wheel 421 to rotate, and the second drive wheel 421 drives the second rack 422 to move.

In other embodiments, the second drive group 420 may also be an active drive group. The second drive wheel 421 in the second drive group 420 can be driven to rotate by the drive structure, so that the second drive wheel 421 drives the second rack 422 and the first drive wheel 411 to rotate, and the first drive wheel 411 drives the first rack 412 to rotate. Or, a motor is used to drive the second rack 422 in the second drive group 420 to move, the second rack 422 drives the second drive wheel 421 to rotate, the second drive wheel 421 drives the first drive wheel 411 to rotate, and the first drive wheel 411 drives the first rack 412 to move.

There are many ways to provide the drive structure. For example, the drive structure is a motor structure. In some embodiments, the drive structure is a winding driver member 430, so as to drive the first drive wheel 411 and/or the second drive wheel 421 to rotate via the winding driver member 430, and move the ejector 300 and the sliding support member 200.

For example, the first drive group 410 is the active drive group, the winding driver member 430 can drive the first drive wheel 411 of the first drive group 410 to rotate, so that the first drive wheel 411 drives the second drive wheel 421 to rotate, and then the first rack 412 and the second rack 422 move.

In some optional embodiments, the second drive group 420 is the active drive group, and the winding driver member 430 can drive the second drive wheel 421 of the second drive group 420 to rotate, so that the second drive wheel 421 drives the first drive wheel 411 to rotate, thereby driving the second rack 422 and the first rack 412 to move.

Figure 12:
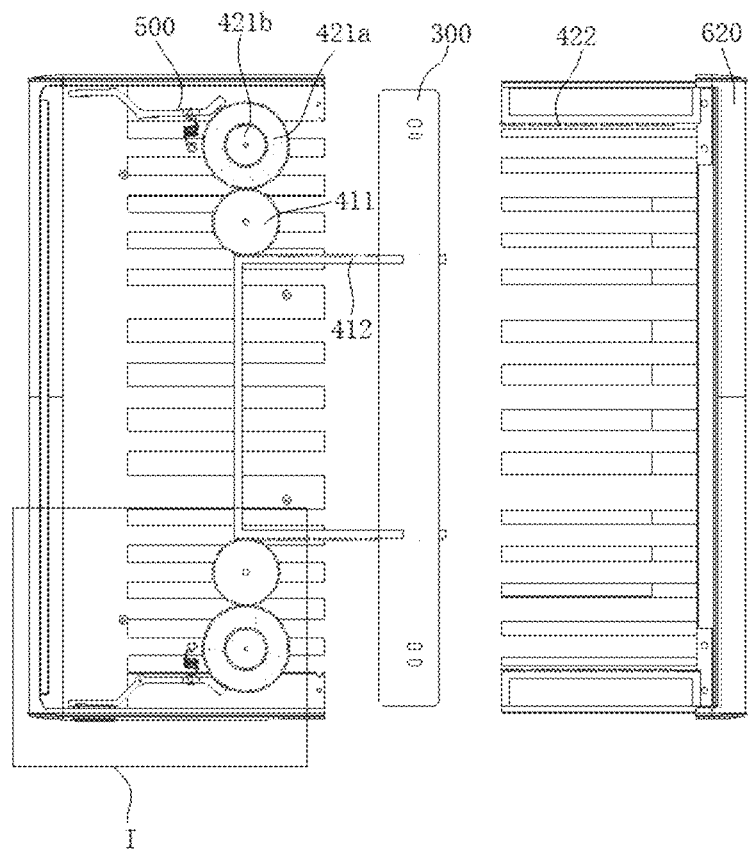
FIG. 12 is a schematic structural diagram of FIG. 11 from another viewing angle.
Figure 13:
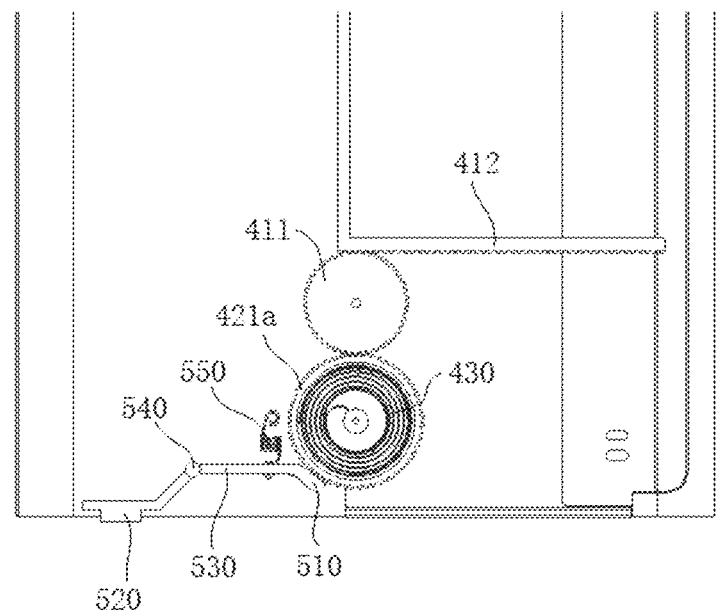
FIG. 13 is a partial enlarged schematic view of Part I in FIG. 12.

As shown in FIG. 12 and FIG. 13, the embodiment of the present disclosure is described by taking the second drive group 420 as the active drive group as an example. The winding driver member 430 is disposed on the second drive wheel 421, the winding driver member 430 drives the second drive wheel 421 to rotate, the second drive wheel 421 drives the first drive wheel 411 to rotate, the second drive wheel 421 also drives the second rack 422 moves, and the first drive wheel 411 drives the first rack 412 to move.

When the second drive wheel 421 includes the first gear 421a and the second gear 421b, the winding driver member 430 may be disposed on any one of the first gear 421a and the second gear 421b. For example, the winding driver member 430 may be disposed on the larger first gear 421a, and the first gear 421a can provide sufficient installation space for the winding driver member 430.

The coil drive member 430 is, for example, a coil spring. The first gear 421a includes, for example, an avoidance recess, and the coil spring is wound in the first gear 421a. When the flexible display panel 10 is in the folded state and the support structural member 20 is in the retracted state, the winding driver member 430 is in the retracted state. The winding driver member 430 can apply a winding driver force to the first gear 421a, so the first gear 421a and the second gear 421b rotates synchronously, the second gear 421b drives the second rack 422 to move, and the second rack 422 drives the sliding support member 200 to move in a direction away from the main body support member 100, and thus the support structural member 20 is transformed from the retracted state to the deployed state. At the same time, the first gear 421*a* is engaged with the first drive wheel 411, the first gear 421*a* drives the first drive wheel 411 to rotate, the first drive wheel 411 drives the first rack 412, and the first rack 412 drives the pushing member 300 to push the flexible display panel 10 transitions from the folded state to the flattened state.

The number of the drive components 400 can be changed according to the actual design. One group of drive components 400 can be provided, and one group of drive components 400 drives the pushing member 300 and the sliding support member 200 to move.

In other embodiments, there are more than two groups of drive components 400, and the more than two groups of drive components 400 are distributed at intervals along the third direction. Different parts of the pushing member 300 and the sliding support member 200 in the third direction are driven by the more than two groups of drive components 400. On the one hand, it can ensure the force balance of the pushing member 300 and the sliding support member 200, and on the other hand, each drive component 400 can push the pushing member 300 and the sliding support member 200 to move with less force.

For example, the drive components 400 are divided into two groups, the two groups of drive components 400 are distributed at intervals along the third direction, and the two groups of drive components 400 are symmetrically distributed with respect to the axis extending in the second direction. The first racks 412 of the two groups of drive components 400 are interconnected to enable the two groups of drive components 400 to drive the pushing member 300 and the sliding support member 200 to move more synchronously.

In some optional embodiments, the support structural member 20 further includes a locking component 500, and the locking component 500 includes a stopping portion 510 and a pressing portion 520. The stopping portion 51 is engaged with the first drive wheel 411 and/or the second drive wheel 421. The pressing portion 520 is fixedly connected with the stopping portion 510 via the connecting rod 530, and the connecting rod 530 is rotatably arranged around a rotating shaft 540, so the pressing portion 520 drives the stopping portion 510 to move and is engaged with or disengaged from the first drive wheel 411 and/or the second drive wheel 421.

In these optional embodiments, pressing the pressing portion 520 enables the connecting rod 530 to rotate, and the connecting rod 530 drives the stopping portion 510 to engage or separate from the first drive wheel 411 and/or the second drive wheel 421, so as to control the rotation of the first drive wheel 411 and/or the second drive wheel 421.

For example, when the second drive group 420 is an active drive group, the second drive wheel 421 includes the first gear 421*a* and the second gear 421*b*, a coil spring is arranged in the first gear 421*a*, and the stopping portion 510 is used to be engaged with the first gear 421*a*. And when the support structural member 20 is in the retracted state, the coil spring is in the retracted state, and the stopper 310 and the first gear 421*a* are engaged with each other to prevent the first gear 421*a* from rotating under the force of the coil spring. The pressing portion 520 is pressed, and the pressing portion 520 drives the connecting rod 530 to rotate around the rotating shaft 540, and the connecting rod 530 drives the stopping portion 510 and the first gear 421*a* to separate from each other. The first gear 421*a* will not be subjected to the force of the stopper 510, and the first gear 421*a* rotates under the force of the coil spring, which drives the group of the first gears 421*a* to rotate, so the drive component 400 can drive the pushing member 300 and the sliding support member 200 to move. When the pressing portion 520 is not pressed, the pressing portion 520 is reset, the connecting rod 530 drives the stopper 510 and the first gear 421*a* to be engaged with each other, the first gear 421*a* will not rotate under the force, so the pushing member 300 and the sliding support member 200 stop moving.

The stopper 510 is, for example, in the shape of a rack, and is provided with two or more sawtooth spaced apart so the stopper 510 can be engaged with the first drive wheel 411 and/or the second drive wheel 421.

The connecting rod 530 can have various shapes. The connecting rod 530 can be straight or bent, as long as pressing the pressing portion 520 enables the connecting rod 530 to drive the stopper 510 to be engaged or separated from the first gear 421*a*.

In some optional embodiments, the locking component 500 further includes an elastic portion 550, one end of the elastic portion 550 is connected to the side of the connecting rod 530 close to the stopping portion 510, and the elastic portion 550 can be reciprocally deformed, so the elastic portion 550 can drive the stopping portion 510 to be engaged with the first drive wheel 411 and/or the second drive wheel 421. Optionally, one end of the elastic portion 550 is connected to the connecting rod 530, and the other end of the elastic portion 550 is fixed to the sliding support member 200.

In these optional embodiments, the elastic portion 550 is connected to the connecting rod 530 and is located on the side of the rotating shaft 540 facing the stop portion 510, and the elastic portion 550 can be reciprocally deformed. Under the elastic force of the elastic portion 550, the connecting rod 530 can drive the stopping portion 510 to be engaged with the first drive wheel 411 and/or the second drive wheel 421.

For example, when the second drive group 420 is an active drive group, the second drive wheel 421 includes the first gear 421*a* and the second gear 421*b*. When the pressing portion 520 is not pressed, the connecting rod 530 rebounds under the force of the elastic portion 550, and the connecting rod 530 drives the stopping portion 510 to be engaged with the first gear 421*a* again.

Optionally, the pressing portion 520 is disposed protruding from the main body support member 100. It is convenient for the user to control the movement of the pushing member 300 and the sliding support member 200 from the outside of the main body support member 100 via the pressing portion 520.

Referring to FIGS. 3 to 10, for example, the main body support member 100 further includes side plates 120 connected to both sides of the bearing portion 110 in the third direction of the support structural member 20. Each of the side plates 120 is provided with an avoidance hole 121. The pressing portion 520 protrudes from the avoidance hole 121. Optionally, the avoidance hole 121 is located at the end of the side plate 120 away from the sliding support member 200 and close to the end of the main body support 100. This arrangement conforms an ergonomic design, is convenient for users to operate the pressing portion 520.

Optionally, the main body support member 100 further includes back plates spaced from the bearing portion 110 along the first direction, and the side plates 120 are connected between the bearing portion 110 and the back plates. The second support portion 220 of the sliding support member 200 is disposed on the back plate and is movably disposed along the second direction relative to the back plate.

Figure 6:
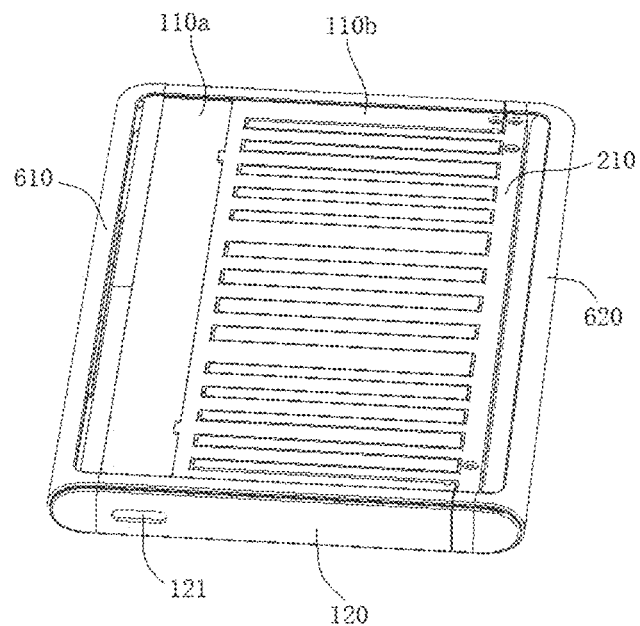
FIG. 6 is a schematic structural diagram of a support structural member provided in an embodiment of the present disclosure in a retracted state.
Figure 7:
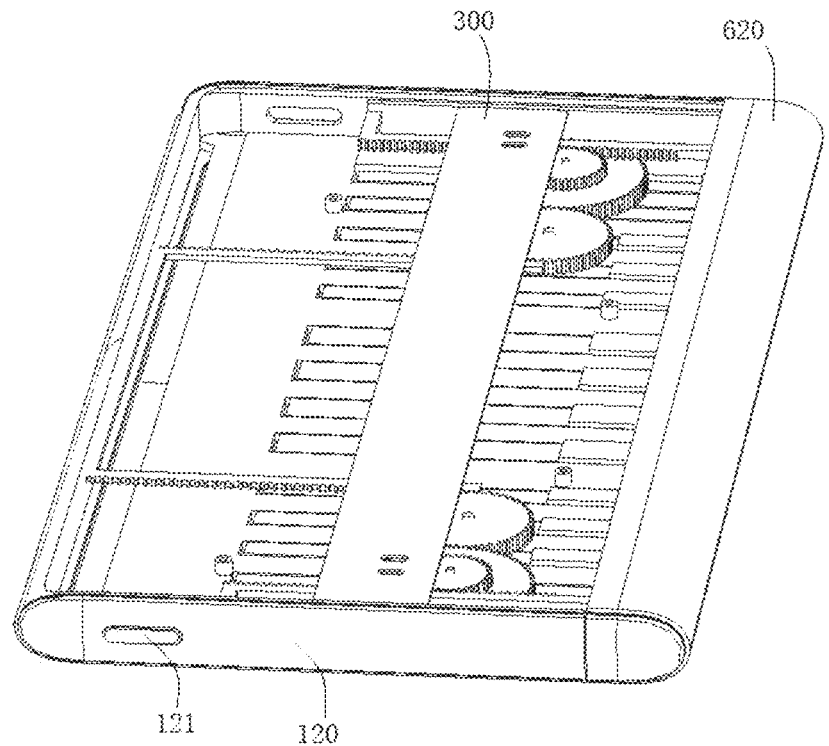
FIG. 7 is a schematic structural diagram of a support structural member provided in an embodiment of the present disclosure in a retracted state.
Figure 8:
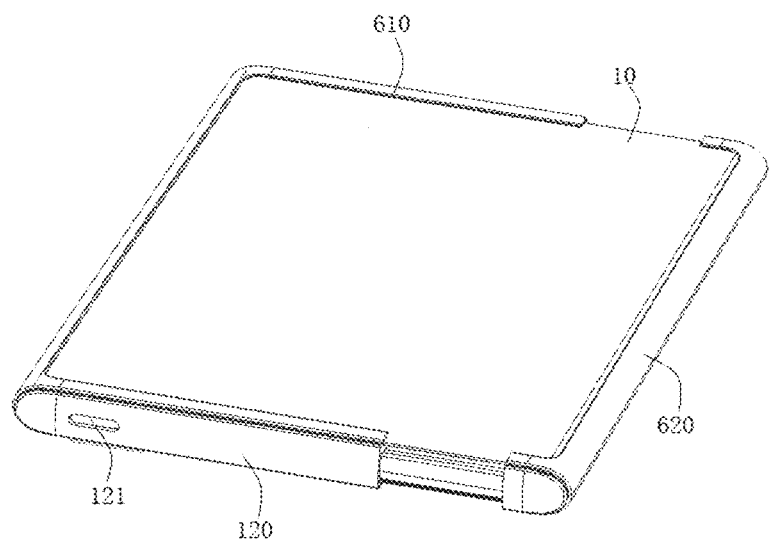
FIG. 8 is a schematic structural diagram of a support structural member provided by an embodiment of the present disclosure in a deployed state.
Figure 9:
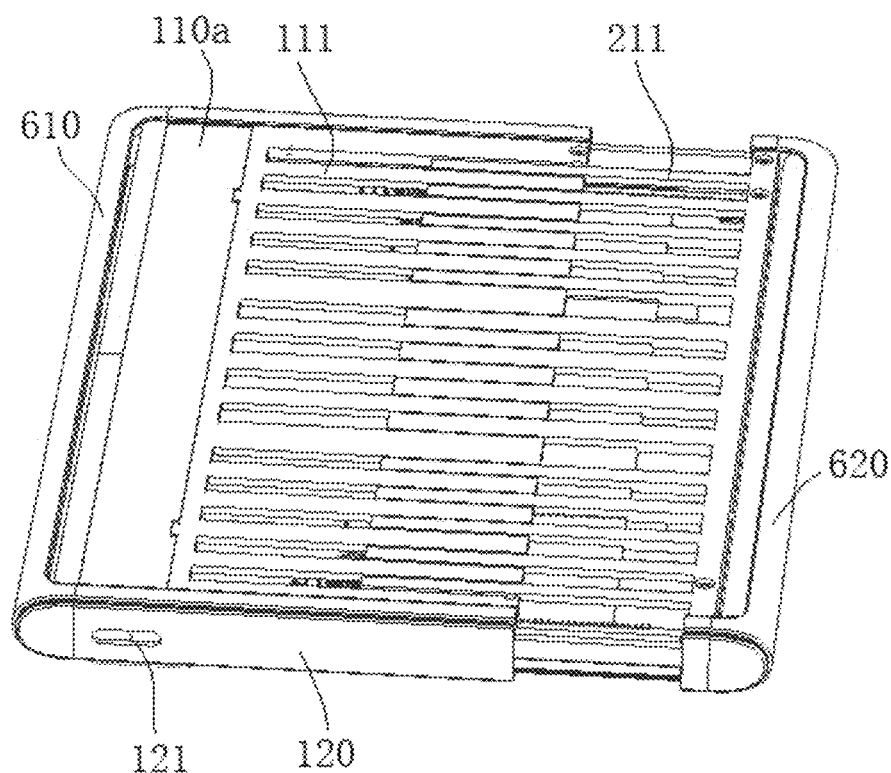
FIG. 9 is a schematic structural diagram of a support structural member provided by an embodiment of the present disclosure in a deployed state.
Figure 10:
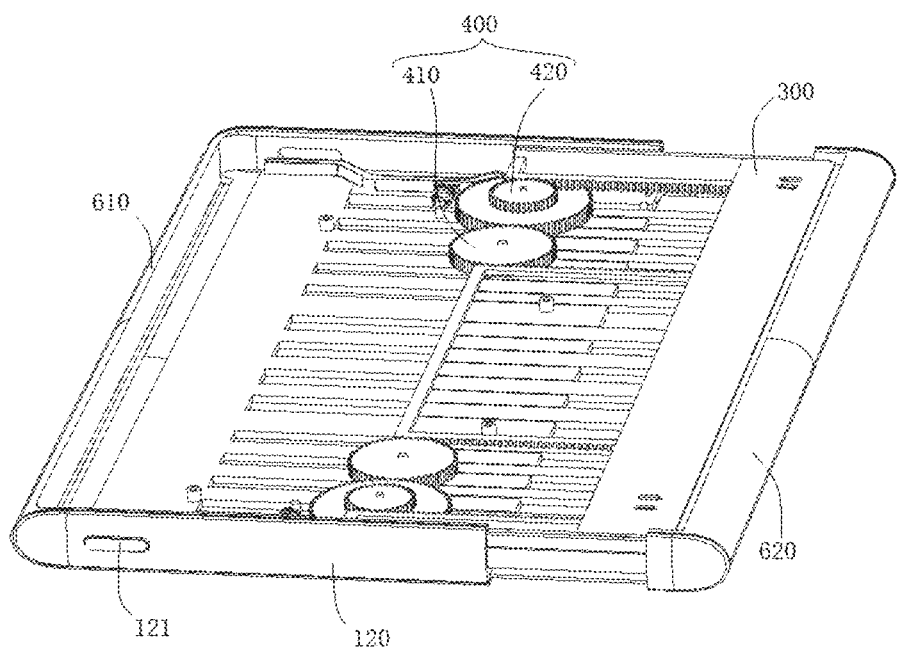
FIG. 10 is a schematic structural diagram of a support structural member provided by an embodiment of the present disclosure in a deployed state.
Figure 11:
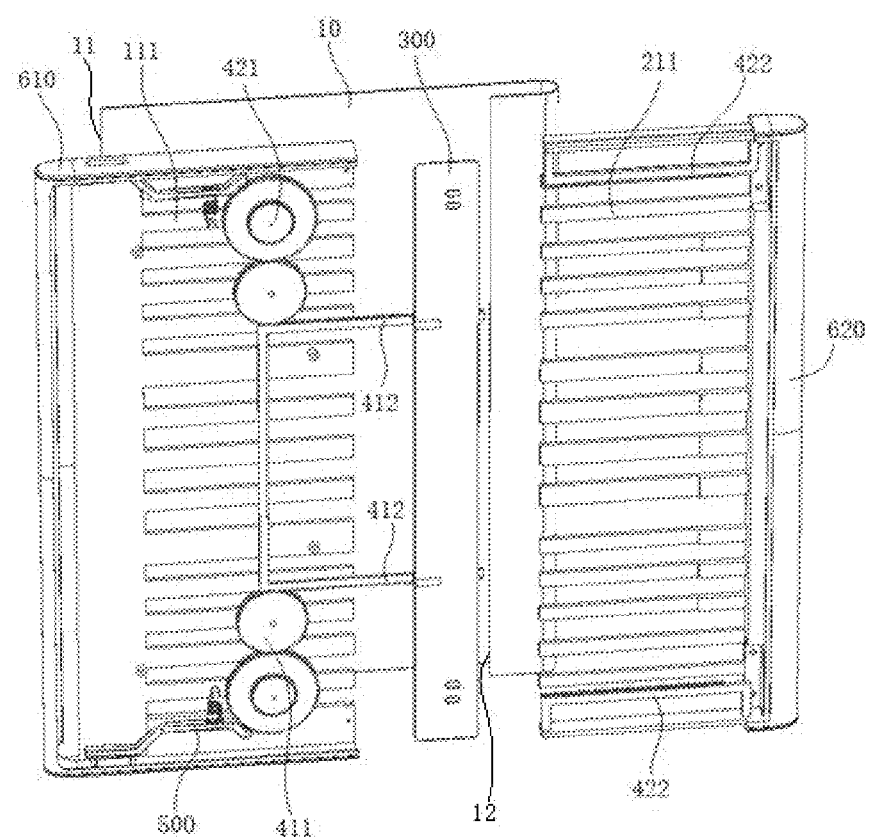
FIG. 11 is a partial perspective exploded view of a support structural member provided by an embodiment of the present disclosure.

Referring to FIGS. 6, 9 and 11, the first support portion 210 includes two or more first support beams 211 spaced along the third direction. The bearing portion 110 includes a first bearing portion 110a and a second bearing portion 110b that are sequentially distributed along the second direction. The second bearing portion 110b is located on the side of the first bearing portion 110a facing the transition connection portion 230, and the second bearing portion 110b includes two or more second support beams 111 spaced apart in the third direction. The second support beams 111 and the first support beams 211 are alternately distributed along the third direction, so the first support portion 210 and the bearing portion 110 can support the flexible display panel 10 on the same plane, to ensure the flatness of the surface for supporting the flexible display panel 10, reduce friction on the flexible display panel 10, and further improve the service life of the flexible display panel 10. The second support beam 111 is provided with a fixing column for fixing the other end of the elastic portion 550.

What is claimed is:

1. A support structural member for a flexible display panel, comprising:
    a main body support member, comprising a bearing portion for bearing a part of the flexible display panel;
    a sliding support member, movably connected to the main body support member along a second direction, wherein the sliding support member comprises a first support portion and a second support portion spaced along a first direction, and the first support portion extends beyond the main body support member and supports the flexible display panel together with the bearing portion;
    a pushing member, movably connected to the second support portion along the second direction, wherein the pushing member comprises a stopper protruding from a support surface of the second support portion for supporting the flexible display panel to stop an end of the flexible display panel and push the flexible display panel to move; and
    a drive component for driving the sliding support member to move relative to the main body support member, wherein the driver component comprises:
        a first drive group, comprising a first drive wheel and a first rack that are engaged with each other, wherein the first rack is connected to the stopper and extends along the second direction;
        a second drive group, comprising a second drive wheel and a second rack that are engaged with each other, wherein the second rack is connected to the second support portion and extends along the second direction, and the second drive wheel is engaged with the first drive wheel.

2. The support structural member according to claim 1, the drive component drives the sliding support member to move relative to the main body support member at a first speed V1 and drives the pushing member to move relative to the second support portion at a second speed V2, wherein the second speed V2 is an integer multiple of the first speed V1.

3. The support structural member according to claim 2, wherein the second speed V2 is twice the first speed V1.

4. The support structural member according to claim 2, wherein the second drive wheel comprises a first gear and a second gear coaxially arranged, the first gear is engaged with the first drive wheel, the second gear is engaged with the second rack, and a radius of the first gear is an integral multiple of that of the second gear.

5. The support structural member according to claim 4, wherein the ratio of the second speed V2 to the first speed V1 is equal to the ratio of the radius of the first gear to that of the second gear.

6. The support structural member according to claim 4, wherein the radius of the first gear is twice the radius of the second gear.

7. The support structural member according to claim 3, wherein at least one of the first drive wheel and the second drive wheel is provided with a winding driver to drive the first drive wheel and the second drive wheel to rotate and drive the sliding support member to extend beyond the main body support member.

8. The support structural member according to claim 7, wherein the winding driver is a coil spring.

9. The support structural member according to claim 8, further comprising: a locking component comprising:
    a stopping portion for engaging with at least one of the first drive wheel and the second drive wheel;
    a pressing portion fixedly connected with the stopping portion via a connecting rod, wherein the connecting rod is rotatably arranged around a rotating shaft to drive the pressing portion move the stopping portion to engage with or disengaged from the first drive wheel and the second drive wheel.

10. The support structural member according to claim 9, wherein the pressing portion is protruded from the main body support member.

11. The support structural member according to claim 9, wherein the locking component further comprises an elastic portion connected to a side of the connecting rod close to the stopping portion, and the elastic portion is reciprocatingly deformable to drive the stopping portion to engage with the first drive wheel and the second drive wheel.

12. The support structural member according to claim 2, wherein there are more than two groups of drive components, and the two or more groups of drive components are spaced apart along a third direction, and the third direction intersects the first direction and the second direction.

13. The support structural member according to claim 12, wherein the two or more groups of drive components are symmetrically distributed along the third direction, and the first racks of the two or more groups of drive components are connected to each other.

14. The support structural member according to claim 1, wherein the pushing member further comprises a main body portion with a bearing surface for bearing the flexible display panel, and the stopper is disposed on the main body portion and protrude from the bearing surface.

15. The support structural member according to claim 14, wherein the number of the stopper is two or more, and the two or more stoppers are distributed on the main body portion at intervals along the third direction.

16. The support structural member according to claim 1, further comprising a transition connection portion on a side thereof away from the main body support member, wherein the first support portion and the second support portion are connected to each other by the transition connection portion, and the first support portion comprises two or more first support beams spaced along the third direction;
    the bearing portion comprises a first bearing portion and a second bearing portion distributed in sequence along the first direction, the second bearing portion is located on a side of the first bearing portion toward the transition connection portion, the second bearing portion comprises two or more second support beams spaced along the third direction, and the second support beams and the first support beams are alternately distributed along the third direction.

17. The support structural member according to claim 1, further comprising: a guard component disposed on outer surfaces of the main body support member and the sliding support member, wherein the guard component is arranged to be spaced apart from the main body support member and the sliding support member.

18. The support structural member according to claim 17, wherein the guard component comprises a first guard portion provided on the main body support member and a second guard portion provided on the sliding support member, the first guard portion and the second guard portion encloses to form a visible window to expose the flexible display panel from the visible window.

19. A display device, comprising:
the support structural member of claim 1;
a flexible display panel, comprising a first end and a second end opposite to each other, wherein the first end is connected to the main body support member, the second end is located on the second support portion and is stopped by the stopper to push the second end to move in a direction away from the main body support member.

* * * * *